Dec. 26, 1950  O. O. LINDBORG  2,535,304
ELECTRONIC DEVICE FOR PERIODIC TIMING
Filed Aug. 18, 1947  2 Sheets-Sheet 1
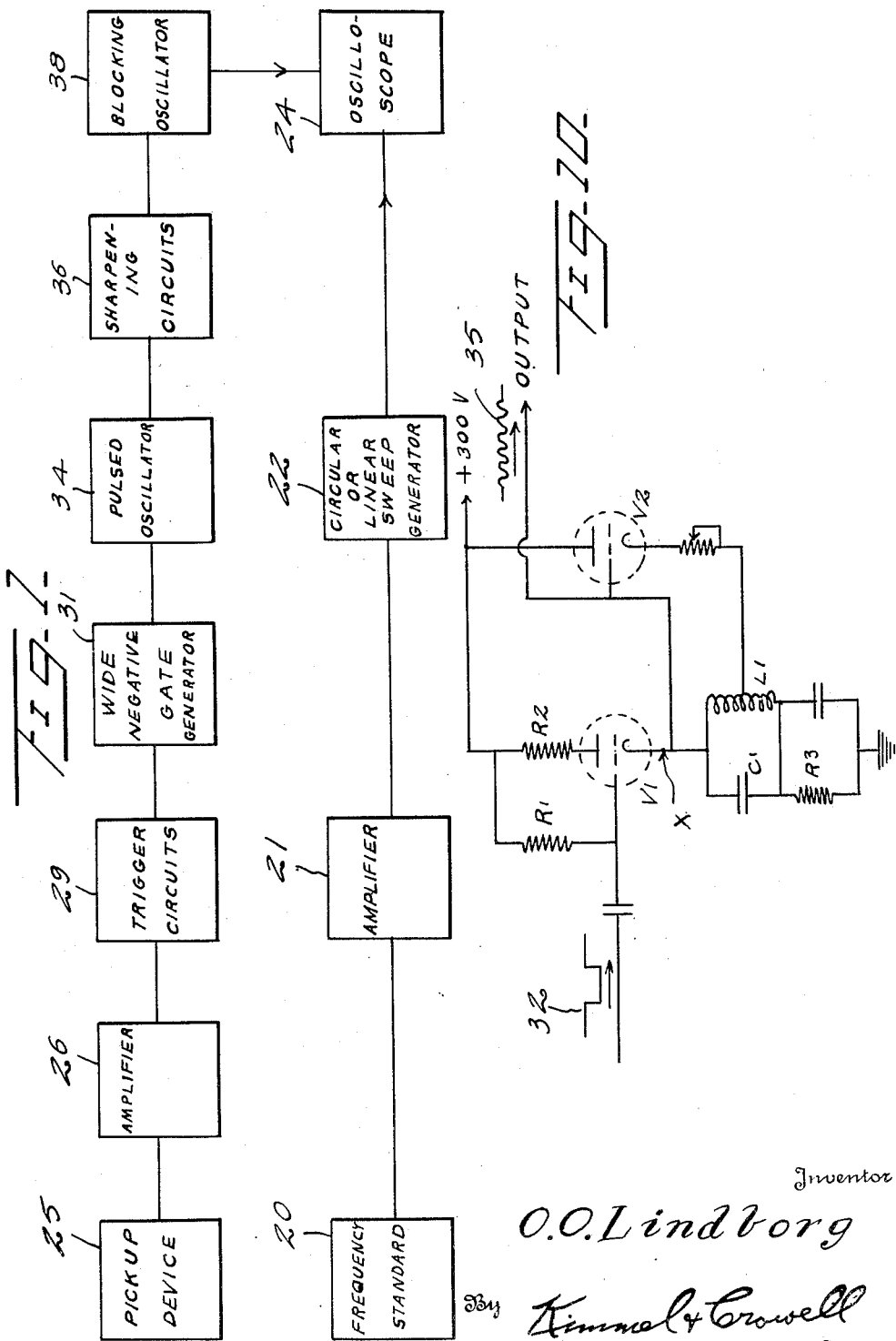
Inventor
O. O. Lindborg
By Kimmel & Crowell
Attorneys

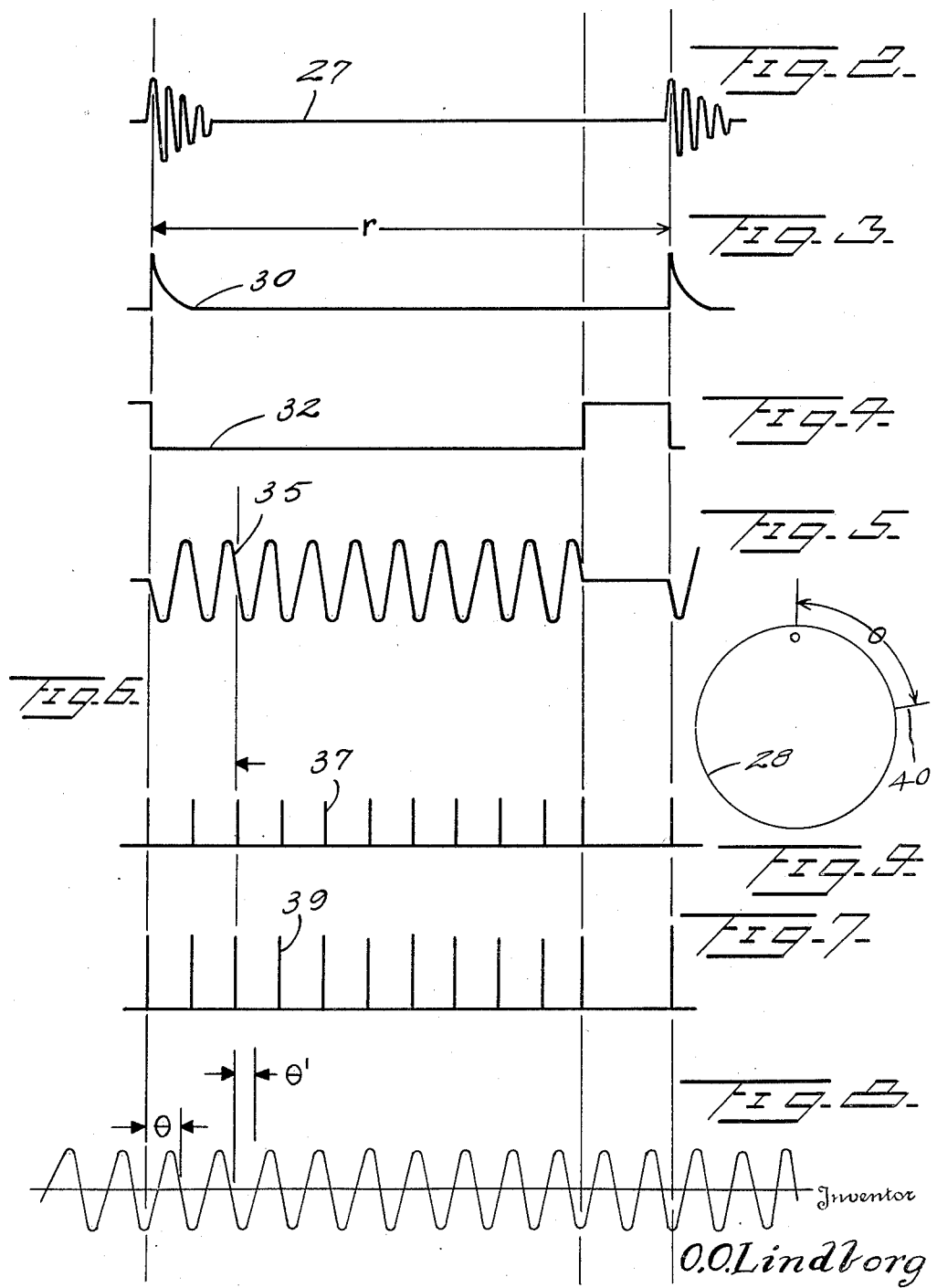

Patented Dec. 26, 1950

2,535,304

UNITED STATES PATENT OFFICE 2,535,304

ELECTRONIC DEVICE FOR PERIODIC TIMING

Oscar O. Lindborg, Charlestown, Mass.

Application August 18, 1947, Serial No. 769,111

7 Claims. (Cl. 73—6)

This invention relates to means for precise measurement of periodic mechanisms and devices and more particularly to an electronic device for determining the accuracy of watches, chronometers and other types of time pieces.

It is an object of this invention to provide a periodic timing device of the kind to be more particularly described hereinafter in which an unknown frequency is compared with a known frequency by a trace and pips on an oscilloscope or cathode ray tube, wherein the pips caused by the unknown frequency are caused to occur substantially as often as the trace of the known frequency so that the pips may be readily perceived, in contradistinction with devices of this kind in the prior art wherein the pips occur so seldom in relation to the trace that they are practically imperceptible.

In the past, the horologist in repairing and cleaning a timepiece, has had to completely disassemble the timepiece in order that thorough repair or cleaning could be effected. When the timepiece has been reassembled, its rate must be properly adjusted and this has been a long process extending over a period of several weeks so that the extreme precision required in the case of watches and chronometers used by various transportation agencies could be obtained. Timepieces used by transportation agencies must be checked from time to time so that the accuracy is known. This has been done by a comparison against a known standard at intervals of several weeks or more and the error noted. As a result it has been necessary to keep continual records of each timepiece in use.

This invention will permit the horologist to precisely regulate a timepiece in about as many minutes as it now takes weeks. Further, he will be able to check the accuracy of any timepiece in a matter of minutes. Obviously this will result in a great saving of time and will permit degrees of accuracy heretofore unattainable except by adjustment and observation over long periods of time.

With the above and other objects in view, my invention consists in the arrangement, combination and details of construction disclosed in the drawings and specification, and then more particularly pointed out in the appended claims.

In the drawings,

Figure 1 is a diagrammatic view of the circuit of this periodic timing device constructed according to an embodiment of this invention, Figure 2 is a diagrammatic view of the wave generated by the amplifier of the pick-up device, Figure 3 is a diagrammatic view of the wave shaped generated by the trigger circuit, Figure 4 is a diagrammatic view of the wave shaped generated by the wide negative gate generator, Figure 5 is a diagrammatic view of the wave shape generated by the pulsed oscillator, Figure 6 is the wave shape generated by the sharpening of pip generating circuit, Figure 7 is a diagrammatic view of the pip generated by the blocking oscillator, Figure 8 is a diagrammatic view of the wave shape generated by the known frequency generator, Figure 9 is a diagrammatic view of the sweep and pips appearing on the oscilloscope, and Figure 10 is a diagrammatic wiring diagram of the pulsed oscillator.

Referring to the drawings, it will be seen that a frequency standard of which there are several types which may be used, is provided for comparison with an unknown frequency.

If a known frequency is chosen which is high compared to the sweep frequency desired, then some system of frequency division must be used as in Patent No. 2,121,359. If the frequency of the standard is the same as the desired sweep, then no frequency division is required and the system resolves itself to that shown by the lowered line of blocks in Figure 1.

The circuit for the frequency standard will include a frequency standard generator 20, an amplifier 21 and a circular or linear sweep generator 22. The waves generated by the frequency standard will form a sweep or trace visible on the oscilloscope 24.

This invention may use a linear sweep as in Patent No. 2,317,202 although a circular sweep or trace is preferable, as Patent No. 2,121,359, in which case the block labeled circular or linear sweep generator performs essentially the same function as the "fast operator" mentioned in Patent No. 2,121,359. The result is the necessary currents for electromagnetic reflections as in Patent No. 2,121,359, or voltages of electrostatic deflection which is deemed preferable to generate a circular trace on the oscilloscope.

All of this circuit for the frequency standard is well known to those schooled in the art and any known means may be used.

Refering to Figure 1, there is shown a pick-up device 25 which may be formed of any conventional pick-up means which will convert the available information of the unknown device into electrical impulses depending upon the nature of the problem at hand. In the case of a timepiece, an acoustic device of the contact type so as to eliminate extraneous noise but give good indication of each tick would be used. At the output of the amplifier 26 connected to the pick-up device 25, a series of wave shapes as shown by the numeral 27 in Figure 2 will be generated. As an example, a sweep speed of 1,000 cycles per second from the frequency generator has been chosen. This means that a sweep will revolve 1,000 times per second or once each 1,000 microseconds and will appear as the trace 28 in Figure 9.

The output of the amplifier 26 is applied to a trigger circuit generator 29 which will generate a wave shape indicated by the number 30, in Figure 3. The trigger circuit is defined as one which operates when an impulse or complex voltage wave is received. A wide negative gate generator 31 is provided for receiving the wave 30 generated by the trigger circuit. The trigger circuit initiates an action which results in the wide negative gate.

The impulse initiated by the device under test, the trigger and the leading edge of the negative gate, are coincident. A wide negative gate is defined as a voltage that is initially at some determined value.

When the trigger circuit operates, this voltage drops quickly to some negative value with respect to the initial value and remains there for a determined time. At the end of this time the voltage quickly returns to its initial value. This results in a voltage wave shape as indicated by the numeral 32 in Figure 4.

The negative gate is applied to the pulsed oscillator 34 which has the property of oscillating only during the time the negative gate is being applied. For the duration of the negative gate the oscillator 34 will deliver a series of sine wave oscillations indicated by the numeral 35, in Figure 5, and at the end of the gate the oscillations will be quickly damped out.

The oscillator can be made to deliver any desired frequency. This series of oscillations from the pulsed oscillator 34 is applied to a suitable sharpening circuit 36 which transforms the sine waves into a series of voltage pips. These pips 37 shown in Figure 6 will occur once for each cycle of the pulsed oscillator.

The output of the sharpening circuit is applied to a triggered blocking oscillator 38. The triggered blocking oscillator 38 will deliver a voltage impulse or pip 39 as shown in Figure 7 of the desired duration and amplitude each time it receives an impulse from the sharpening circuit.

The blocking oscillator 38 may be of the type known as a count-down blocking oscillator. It may be constructed to deliver one trigger for any predetermined number that it receives. For instance, if the blocking oscillator is a 1 to 4 count-down circuit it will deliver a trigger simultaneous with each fourth impulse it receives.

Impulses or voltage pips from the blocking oscillator 38 are applied to the cathode ray oscilloscope 24. They can be made to intensify the electron beam in which case a bright spot appears on the sweep or they can be made to deflect the electron beam in which case a pip appears on the sweep.

Assuming that we have such a thing as a perfect watch which has five beats per second or a beat every 200,000 microseconds, this means that a beat will occur every 200 sweeps of the trace generated by the frequency standard 20 on the oscilloscope 24. In the timing systems heretofore provided, it would be possible to get a deflection of the sweep once every 200th revolution and this deflection would be so faint in comparison to the known trace or base line that it would be almost impossible to observe.

According to this invention this difficulty is overcome in a manner described below.

The frequency of the unknown device is started in the circuit by the pick-up 25, the output of which is fed to an amplifier 26. It is evident that the output of the amplifier will be a series of pulses occurring at intervals of 200,000 microseconds. These pulses are fed to the trigger circuits which generate a trigger 30 that is coincident with the leading edge of each pulse. Any one of the known methods of producing a desired trigger as 30 may be used. This trigger 30 is applied to the wide negative gate generator 31. The amplitude of the charge and the width or duration of the gate are determined by the circuit constants.

For purposes of illustration, this gate will be assumed to be 180,000 micro-seconds wide. The circuit action which generates the gate 32 is initiated by the trigger 30, therefore the negative going edge of the gate and the trigger are coincident. Any one of numerous known circuits are available and may be used for the generation of the gate 32.

This gate 32 is applied to what I have termed a pulsed oscillator. The pulsed oscillator 34 has the property of oscillating and generating an undamped series of oscillations only during the duration of the negative gate.

The Figure 10 shows a diagrammatic view of the wiring of the pulsed oscillator. It can be seen that the grid of the tube V—1 is connected to plus 300 volts through the resistor R—1 which is sufficiently large to limit the grid current and hold the grid slightly positive with respect to the cathode. In this quiescent state the tube V—1 will be passing a large amount of current which flows through the resistor R—2, the tube V—1, the inductor L—1, and the resistor R—3 to the ground.

Some current will also flow through the tube V—2 to the ground. When the negative gate 32 is applied to the grid of the tube V—1 the tube will be cut off and the flow of the current will cease. This has the same effect as if the circuit were suddenly opened at the point X. This sudden interruption of current flow immediately shocks the resonant circuit L1C1 into oscillation. The resonant circuit and the tube V—2 now constitute a conventional oscillating circuit which will continue to oscillate as long as the tube V—1 is held in a cut off condition by the application of the negative gate to the grid thereof.

At the end of the negative gate the current flow is resumed and the oscillations in the oscillating circuit are quickly damped out. For illustrative purposes, the frequency of this oscillator will be the same as the frequency which is generating the circular sweep 28, namely 1,000 cycles per second and the duration of a complete cycle will be 1,000 micro-seconds.

It is evident that since the gate 32 is 180,000 micro-seconds long, there will be 180 complete cycles generated by the pulsed oscillator 34 following each tick or beat of the watch. Also it is evident that the first cycle of each series will start coincident with the watch tick. These time relations of the waves generated throughout the circuit are indicated throughout the Figures 2 to 8 inclusive.

The oscillations from the pulsed oscillator are then fed to suitable sharpening circuits which distort the sine wave into a suitable series of pips 37. Several methods are presently available for accomplishing this. The result is that a voltage pip will occur once each cycle and furthermore the pips bear a definite time relation to the sine waves which is consistent.

The pips will occur approximately at the time the sine wave crosses the zero axis going in a negative direction. This is indicated by a comparison of Figures 5 and 6. It is evident then that 180 voltage pips will occur following each tick, the first of which is coincident with the leading edge of the tick and they will occur at intervals of exactly 1,000 micro-seconds.

The voltage pips 37 are fed to a blocking oscillator 38 in which a pip of the desired amplitude and shape are generated. The output of the blocking oscillator 38 is a series of the desired pips, 180 in number, the first being coincident with the leading edge of the tick with the remaining 179 occurring at exactly 1,000 microsecond intervals. These pips 39 are applied to the cathode ray tube and duplicate the sweep 28. The tick from our theoretically perfect watch can occur at any instant of time thus starting a series of pips at some position of the sweep on the cathode ray tube.

Since the impulse from the watch may occur at any time during a cycle of the standard frequency, there will be a phase angle $\theta$ between the standard frequency and the frequency of the pulsed oscillator which will be consistent for any one given series of oscillations. The time at which the impulse from the pick-up device occurs determines the position of $\theta$ and it may vary with each impulse.

The first of the series of pips from the pulsed oscillator deflects the sweep on the oscilloscope 24 as shown at 40 in Figure 9 and exactly 1,000 micro-seconds later the second deflection occurs at the same place since the sweep rotates in 1,000 micro-seconds. This process will continue for 180 sweeps immediately following the tick. The position of this series of deflections has been determined by the leading edge of the tick.

After the 180th deflection there is an interval of 20,000 micro-seconds or 20 sweeps on which no deflection occurs. Thus the sweep has been deflected for 180 of the 200 sweeps instead of one sweep of the 200 as could only have been done by the prior art.

The deflection 40 therefore appears to all practical purposes as bright as the line or sweep 28 initiated by the frequency standard.

From our example, the next tick and all those following would occur at exactly 200,000 microsecond intervals. In this case the value of $\theta$ would not change and each series of pips or deflections 40 will occur at exactly the same place in the sweep. The appearance will be that of a single stationary pip thus indicating the watch is keeping perfect time. If the watch is out of time, the ticks will not occur at exactly 200,000 microsecond intervals, in which case $\theta$ will change for each tick and each series of deflections will assume a new position on the sweep. This will appear as a pip moving around the sweep in one direction if the watch is gaining or in the opposite direction if it is losing.

I do not mean to confine myself to the exact details of construction herein disclosed but claim all variations falling within the purview of the appended claims.

I claim:

1. A periodic timing device comprising an oscilloscope, means producing a trace on said oscilloscope at a known frequency, a pick-up device actuated by a source of an unknown frequency, an amplifier for said pick-up device for amplifying the pulses therefrom, a trigger generator connected to said amplifier to generate a trigger coincident with each of said pulses, a negative gate generator connected to said trigger circuit for generating a negative gate initiated by said trigger, an oscillator connected to said negative gate generator for generating an undamped series of oscillations during the duration of said negative gate the beginning of said series of oscillations occurring coincident with the pulse from said pick-up device, and means connecting said oscillator to said oscilloscope for deflecting said trace in timed relation to the unknown frequency and each of said oscillations, whereby the deflection is sustained substantially through the interval between successive cycles of the unknown frequency thus providing an image of an intensity substantially equivalent to that of said trace for facilitating the observation thereof.

2. A periodic timing device comprising an oscilloscope, means producing a trace on said oscilloscope at a known frequency, a pick-up device actuated by an unknown frequency for producing an electrical current having the unknown frequency, a trigger circuit initiated by said electrical current, a negative gate generator actuated by said trigger circuit for producing a negative gate, an oscillator initiated by said negative gate generator and adapted to generate an undamped series of oscillations during the duration of said negative gate, and means connected between said oscillator and said oscilloscope deflecting said trace in timed relation with each of said oscillations and hence the unknown frequency whereby the image of said deflection will be substantially as bright as said trace thus facilitating the observation of the travel of said deflection relative to said trace.

3. A periodic timing device comprising an oscilloscope, means operatively connected to said oscilloscope and adapted to produce a visual trace on the latter at a known frequency, a source of unknown frequency to be compared with said known frequency, means connected to said source and to said oscilloscope adapted to deflect said visual trace in timed relation to said unknown frequency, and a pulsed oscillator interposed between said second named means and said oscilloscope and adapted to continue said deflection substantially throughout the interval between successive cycles of said unknown frequency whereby the image of said deflection will have an intensity substantially the same as that of said trace thus facilitating observation of the travel of said deflection relative to said trace.

4. A periodic timing device comprising an oscilloscope, means operatively connected to said oscilloscope and adapted to produce a visual trace on the latter at a known frequency, oscillator means actuated by a source of unknown frequency and connected to said oscilloscope to produce a deflection of said trace in timed relation to the unknown frequency, and pulse gating means interposed between said first named means and said oscilloscope and adapted to continue said deflection substantially throughout the interval between successive cycles of the unknown frequency whereby the image of said deflection will be substantially as bright as said trace thus facilitating observation of the travel of said deflection relative to said trace.

5. A periodic timing device as set forth in claim 4 wherein said latter means includes a resonant circuit set into oscillation by said unknown frequency.

6. A periodic timing device as set forth in claim 4 wherein said latter means includes an undamped resonant circuit set into oscillation by each cycle of said unknown frequency and means actuated by said first named means and adapted to damp said resonant circuit prior to a successive cycle of said unknown frequency.

7. A periodic timing device comprising an oscilloscope, means operatively connected to said oscilloscope adapted to produce a visual trace on the latter at a known frequency, a source of unknown frequency to be compared with said known frequency, means actuated by said source and adapted to generate a series of current impulses in timed relation to said unknown frequency, pulsed oscillator means connected to said means actuated by said source and adapted to generate a series of oscillations substantially throughout the interval between successive current impulses generated by said means actuated by said source and in timed relation thereto, and means connected to said pulsed oscillator means and to said oscilloscope adapted to cause the deflection of said trace in timed relation to said series of oscillations whereby the said image of said deflection will have an intensity substantially equivalent to that of said trace, thus facilitating the observation of travel of said deflection relative to said trace.

OSCAR O. LINDBORG.

REFERENCES CITED

The following references are of record in the file of this patent:

UNITED STATES PATENTS

| Number | Name | Date |
| --- | --- | --- |
| 2,121,359 | Luck et al. | June 21, 1938 |
| 2,155,280 | Mikina | Apr. 18, 1939 |
| 2,317,202 | Kohlhagen | Apr. 20, 1943 |

FOREIGN PATENTS

| Number | Country | Date |
| --- | --- | --- |
| 496,666 | Great Britain | Dec. 5, 1938 |

OTHER REFERENCES

Publication "Radar Electronic Fundamentals," War Dept. T. M. 11–466, June 29, 1944.